May 11, 1954  R. I. BATES  2,678,061
SHOCK ABSORBER VALVE
Filed July 25, 1950

INVENTOR
RALPH. I. BATES
BY Willits, Hardman and Fisher
HIS ATTORNEYS

Patented May 11, 1954

2,678,061

UNITED STATES PATENT OFFICE 2,678,061

SHOCK ABSORBER VALVE

Ralph I. Bates, Dayton, Ohio, assignor to General Motors Corporation, Detroit, Mich., a corporation of Delaware Application July 25, 1950, Serial No. 175,755

1 Claim. (Cl. 137—512.15)

This invention relates to improvements in fluid flow control devices particularly adapted for hydraulic shock absorbers.

It is among the objects of the present invention to provide a fluid flow control device for a hydraulic shock absorber, said device consisting of a flexible disc normally closing fluid passages in the piston of the shock aborber, certain portions of said discs being clamped tightly against the piston to prevent flexing of said portions while other predeterminately sized and shaped portions are free to flex and establish controlled fluid flow through the piston.

A further object of the present invention is to provide a flexible disc valve for a shock absorber piston, the control portion of said valve being secured to the piston, the peripheral portion of the disc valve engaging the piston to close the fluid passages therein, predetermined peripheral areas of said disc valve being immovably clamped against the piston while the remaining peripheral areas are free to flex a limited distance away from the piston for effecting a controlled fluid flow through said piston.

Flexible disc valves secured at their center to pistons and having their continuous peripheral portions capable of flexing out of contact with the piston to effect controlled fluid flows through the piston passages, are well known. Such valves are flexed into dish-shape by fluid pressure acting through the piston passages. Generally these valves, when assembled on the piston, are initially stressed so that their peripheral portions continuously engage the piston with a predetermined pressure.

The valve of the present invention has a portion of its peripheral piston engaging area clamped immovably against the piston while a predetermined remaining portion is unclamped and free to be flexed by fluid pressure. The clamping medium presents a chord-like edge providing the fulcrum line parallel to which the free portion of the valve progressively flexes. In response to pressure, the movable arc-like line of contact of the flexible valve with the piston separates from the piston, starting at a point at which a radii of the valve bisects the arc-like line of contact and as the pressure increases, the flexible portion of the valve progressively moves from engagement with the piston with a gradual smooth rolling action which may be likened to a "peeling" action. The return action of the valve is similar as the pressure decreases. In a test machine, a valve of this type of construction produces a sinuous gradually undulating curve, indicating smooth action.

Further objects and advantages of the present invention will be apparent from the following description, reference being had to the accompanying drawing, wherein a preferred embodiment of the present invention is clearly shown.

Figure 1:
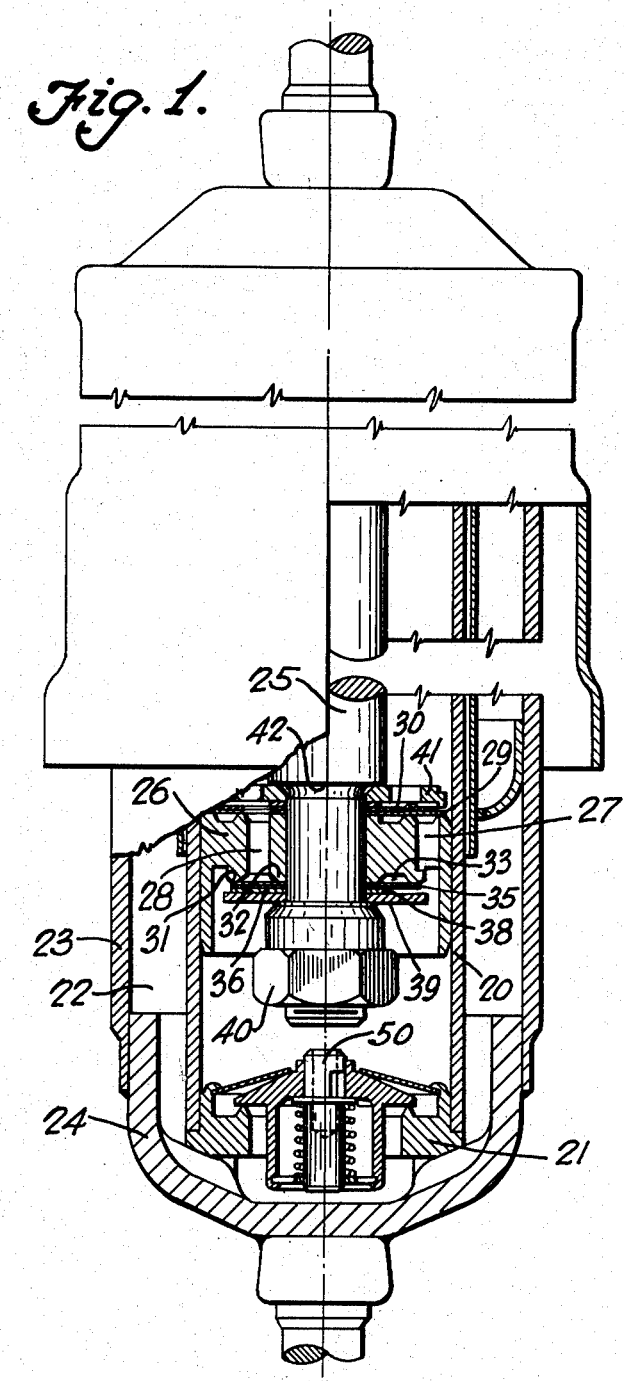
Fig. 1 is a fragmentary sectional view of a direct acting, hydraulic shock absorber equipped with the present novel valve.

Referring to the drawing the present invention is shown applied to a direct acting hydraulic shock absorber consisting of a cylinder 20 having a closure member 21 at one end, said closure member having valved passages providing communication between the cylinder 20 and the fluid reservoir 22. A tube 23, surrounding the cylinder 20, forms the reservoir 22, the tube having an end cup 24 upon which the cylinder closure member 21 rests.

A piston rod 25 slidably extends through a closure member at the end of cylinder 20 opposite the closure member 21, the rod having a reduced diameter portion at its inner end upon which the piston 26 is attached. Piston 26 has a plurality of through passages providing for the transfer of fluid from one side of the piston to the other as the piston is reciprocated in the cylinder. These passages are arranged in two concentric annular rows, the outer or larger row comprising passages 27 and the inner or smaller diameter row, the passages 28. A flexible disc valve 29 is yieldably urged against one side of the piston 26 by a spring 30 normally to close the passages 27. Both valve 29 and spring 30 are however perforated to keep passages 28 constantly open at this end of the piston. At the other end of the piston 26 an annular ridge 31 surrounds the open ends of passages 28, the apex of said ridge 31 being substantially flush with an annular central hub portion 32 on the piston, thereby forming an annular channel 33 in communication with all passages 28.

Figure 2:
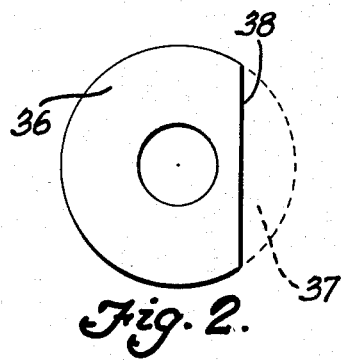
Fig. 2 is a view of the preferred form of one element of the valve mechanism.

A ring-shaped, flexible disc valve 35 fits about the reduced diameter portion of the piston supporting rod 25 and engages the annular ridge 31 and outer end edge of hub 32 on the piston to cover completely the annular channel 33. A ring-shaped disc 36, of predetermined thickness fits about rod 25 and engages the flexible disc valve 35. This disc 36 is detailedly shown in Fig. 2 A segmental portion 37, shown in phantom in Fig. 2, is cut away leaving the chord-like edge 38. Inasmuch as the disc 36 is substantially the same size as the flexible disc 35, it may be seen that when disc 36 is placed upon resilient disc 35, as shown in Fig. 1, the entire area of disc 35 is supported or backed by the disc 36 excepting a segmental area like 37 bounded by the edge line 38 and the dotted line as indicated in Fig. 2. This segmental shaped area of the disc 35 is therefore unsupported and free to flex. A ring-shaped disc or abutment plate 39 is placed upon rod 25 against the disc 36, this plate being somewhat larger in diameter than the resilient disc 35 and may be rigid or semi-rigid as desired. To clamp all of these elements in position on rod 25, a nut 40 is screwed upon the rod to engage plate 39 pressing it against disc 36, disc 36 against disc valve 35, valve 35 against the piston 26, piston 26 against disc valve 29 and it against spring 30 which has a backing plate 41 interposed between it and the annular shoulder 42 formed on the rod 25. Thus nut 40 holds all of these elements as recited in clamped assembly on the rod 25.

When the piston 26 is moved downwardly as regards Fig. 1, fluid in the cylinder portion beneath the piston will be forced upwardly through passages 27, lifting valve 29 against the effect of spring 30 to establish a fluid flow into the expanding cylinder space above the piston. Due to the presence of the rod 25 in this space all the fluid displaced from the cylinder space beneath the piston cannot be received by the upper space so that the fluid displaced by the rod 25 will be ejected from the lower cylinder space through valve 50 in the closure member 21 into the reservoir 22. Valve 50 restricts fluid discharge from the cylinder and therefore the shock absorber piston movement downwardly is resisted.

When the piston 26 moves upwardly in the cylinder, pressure upon the fluid in the rod containing cylinder chamber will cause the fluid, under pressure, to move valve 35 for opening passages 28 to establish a fluid flow therethrough. As has previously been described, all but a segmental area of the flexible disc valve 35 is rigidly clamped against the piston 26 or more particularly the annular ridge 31 thereon by the rigid disc 36, which, as shown in Figs. 1 and 2, renders only a segmental shaped portion of the valve similar to that designated by the numeral 37 in Fig. 2, to be capable of being flexed by fluid pressure. At a predetermined fluid pressure within the annular channel 33, the central peripheral edge portion of the segmentally shaped area, not engaged by disc 36 will start to disengage with the ridge 31. As the fluid pressure gradually increases, the unsupported and free area of the flexible disc valve 35 will progressively leave the annular ridge 31, this separation being effected by a smooth and gradual rolling like movement of the unsupported area of the valve, the flexing movement of said disc valve, with what might be described as a peeling action, taking place progressively along a line parallel with the chord-like edge 38 of the rigid backing disc 36. In response to decreasing pressures in the upper chamber, the return action of the valve 35 is in a similar manner, that is, with a rolling effect. This progressive movement of the free portion of valve 35 away from and toward its seat on the piston results in a smooth control offered by the shock absorber instead of a jerky control which results where valve movements occur with a sudden snap action.

The abutment plate or disc 36 limits the range of movement of valve 35 in response to fluid pressure, thereby eliminating the possibility of damage to the valve in case of an excessive fluid pressure.

Figure 3:
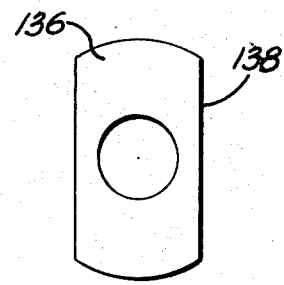
Figs. 3 and 4 are views of modified forms of the element shown in Fig. 2.
Figure 4:
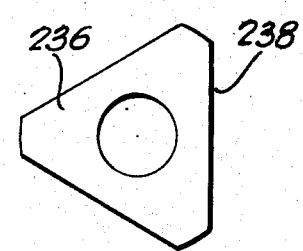

The present invention lends itself particularly to simple and inexpensive changes in assembly to obtain various degrees of shock absorber control. When reduced or less strenuous shock absorber control is required in certain installations, backing discs such as 136 in Fig. 3 or 236 in Fig. 4 may be used instead of the disc 36 which provides for more severe resistance by the shock absorber. Disc 136 provides for two, oppositely disposed free segmental areas of valve 35 which, responsive to pressure, will provide for lesser restriction to fluid flow through the piston. The triangularly shaped disc 236 of Fig. 4 will provide for still less restriction and therefore reduced resistance offered by the shock absorber. In some instances, the desired changes in shock absorber resistance may be attained by using disc valves 35 of thinner, more flexible material and in the other direction, multiple disc valves 35, in superposed relation, may be used, which, of course, would result in an increased restriction.

Shock absorber resistance may also be varied by using thinner or thicker spacer washers 36, 136 or 138 or by varying the distance of the straight sided edges 38, 138 or 238 from the center of the respective washers.

Commercial production is facilitated by the present invention inasmuch as close tolerances and substantially constant stressing pressures initially exerted on valves of different construction are substantially reduced if not completely eliminated.

While the embodiment of the present invention as herein disclosed constitutes a preferred form, it is to be understood that other forms might be adopted.

What is claimed is as follows:

A valve for controlling fluid flow through the passages of a shock absorber piston, comprising in combination, a flexible disc centrally positioned upon the piston to close the passages therein, a rigid disc positioned centrally of the piston and disposed upon the flexible disc securing the portions of the flexible disc engaged thereby at the periphery thereof immovably to the piston, said rigid disc having a peripheral chord-like portion removed rendering a correspondingly positioned chord-like portion of the flexible disc unsupported and free for flexing and an abutment plate on said piston of substantially the same diameter as said disk and engageable by the flexing portion of said flexible disc to limit movement thereof.

References Cited in the file of this patent

UNITED STATES PATENTS

| Number | Name | Date |
| --- | --- | --- |
| 2,139,313 | Neubauer | Dec. 6, 1938 |
| 2,148,839 | Rossman | Feb. 28, 1939 |
| 2,159,289 | Nickelsen | May 23, 1939 |
| 2,194,726 | Thomas | Mar. 26, 1940 |
| 2,311,833 | Holland | Feb. 23, 1943 |
| 2,320,697 | Binder | June 1, 1943 |
| 2,346,275 | Read | Apr. 11, 1944 |